US008479869B2

(12) United States Patent
Knapp

(10) Patent No.: US 8,479,869 B2
(45) Date of Patent: Jul. 9, 2013

(54) MACHINE, IN PARTICULAR CONSTRUCTION MACHINE

(75) Inventor: Hans Knapp, Bischofshofen (AT)

(73) Assignee: Liebherr-Werk Bischofshofen Ges. m.b.H., Bischofshofen (AT)

( * ) Notice: Subject to any disclaimer, the term of this patent is extended or adjusted under 35 U.S.C. 154(b) by 1733 days.

(21) Appl. No.: 11/804,128

(22) Filed: May 17, 2007

(65) Prior Publication Data

US 2007/0278030 A1 Dec. 6, 2007

(30) Foreign Application Priority Data

May 17, 2006 (DE) ..................... 20 2006 007 915 U
Jun. 12, 2006 (DE) ..................... 20 2006 009 223 U

(51) Int. Cl.
*B60K 6/08* (2006.01)
*B60K 6/12* (2006.01)

(52) U.S. Cl.
USPC ............................ 180/305; 180/306; 180/307

(58) Field of Classification Search
USPC ................ 180/165, 305–307; 138/26, 28, 30, 138/31; 137/206, 207, 207.5, 208–211, 212–214, 211.5
See application file for complete search history.

(56) References Cited

U.S. PATENT DOCUMENTS

| | | | | |
|---|---|---|---|---|
| 2,141,356 | A * | 12/1938 | Koerver | 417/213 |
| 3,903,696 | A * | 9/1975 | Carman | 60/414 |
| 3,990,235 | A * | 11/1976 | Bauchet | 60/413 |
| 4,174,929 | A * | 11/1979 | Grakov et al. | 417/437 |
| 4,367,981 | A * | 1/1983 | Shapiro | 405/224.2 |
| 4,520,840 | A * | 6/1985 | Michel | 137/259 |
| 4,590,796 | A * | 5/1986 | Baatz | 73/114.42 |
| 4,760,697 | A * | 8/1988 | Heggie et al. | 60/408 |
| 4,781,061 | A * | 11/1988 | Baumgartl | 73/149 |
| 4,858,898 | A * | 8/1989 | Niikura et al. | 267/218 |
| 5,299,626 | A * | 4/1994 | Iwamoto | 164/457 |
| 5,495,912 | A * | 3/1996 | Gray et al. | 180/165 |
| 5,579,640 | A * | 12/1996 | Gray et al. | 60/413 |
| 5,622,217 | A * | 4/1997 | Iwamoto et al. | 164/457 |
| 5,944,159 | A * | 8/1999 | Schneider et al. | 192/85.63 |
| 6,071,096 | A * | 6/2000 | Grasl | 417/534 |
| 6,170,587 | B1 * | 1/2001 | Bullock | 180/69.6 |
| 6,758,096 | B1 * | 7/2004 | Schon et al. | 73/708 |
| 6,834,737 | B2 * | 12/2004 | Bloxham | 180/165 |
| 6,983,592 | B2 * | 1/2006 | Bruun | 60/415 |
| 7,308,976 | B2 * | 12/2007 | Turner | 188/282.8 |
| 2008/0314664 | A1 * | 12/2008 | Mueller et al. | 180/165 |
| 2009/0165451 | A1 * | 7/2009 | Mueller et al. | 60/478 |
| 2009/0173220 | A1 * | 7/2009 | Fusari et al. | 91/361 |

* cited by examiner

*Primary Examiner* — John R Olszewski
*Assistant Examiner* — Travis Coolman
(74) *Attorney, Agent, or Firm* — Dilworth & Barrese LLP

(57) ABSTRACT

This invention relates to a machine, in particular a construction machine and preferably a wheel loader or dumper, comprising a pump, an energy accumulator connected with the pump, which includes a first space which is gas-filled and which includes a second space which is designed such that in operation of the pump it is filled by a fluid delivered by means of the pump, wherein the gas contained in the first space is compressed, and comprising a hydraulic motor to be driven by means of the energy accumulator, wherein the energy accumulator is designed such that the ratio of the volume of the first space with fully loaded second space to the volume of the first space with non-loaded second space is >0.5.

23 Claims, 2 Drawing Sheets

MACHINE, IN PARTICULAR CONSTRUCTION MACHINE

BACKGROUND OF THE INVENTION

The present invention relates to a machine, in particular a construction machine and preferably a wheel loader or a dumper.

Such machines are known in a number of different constructions. As drive unit in particular of construction machines, there is usually provided a Diesel engine, which effects the traveling drive of the machine for instance via a hydrostatic transmission. For driving the machine, different concepts are known. There is known, for instance, a direct hydrostatic transmission for wheel loaders, in which a swashplate displacement pump cooperates with two inclined-axis motors. The size thereof and their arrangement on the additional powershift transmission provides for a plurality of continuously variable driving modes with smooth transitions. One advantage of this concept consists in fuel savings as compared to other constructions.

SUMMARY OF THE INVENTION

It is the object underlying the present invention to develop a machine as mentioned above to the effect that the efficiency thereof is improved as compared to known machines.

This object is solved by a machine with the features herein.

Accordingly, it is provided that the machine comprises a pump as well as an energy accumulator connected with the pump, which includes a first space which is gas-filled, and which includes a second space which is designed, such that in operation of the pump it is filled by a fluid delivered by means of the pump, which leads to the compression of the gas contained in the first space. The machine furthermore comprises a hydraulic motor to be driven by means of the energy accumulator. Furthermore, it is provided that the energy accumulator is designed such that the ratio of the volume of the first space with fully loaded second space to the volume of the first space with non-loaded second space is >0.5.

As compared to conventional constructions, the accumulator in accordance with the invention thus has a distinctly larger gas volume relative to the second space, which can for instance be an oil exchange volume.

Said object furthermore is solved by a machine with the features herein. Accordingly, it is provided that the machine comprises a pump as well as an energy accumulator connected with the pump, which includes a first space which is gas-filled, and which includes a second space which is designed such that in operation of the pump it is filled by a fluid delivered by means of the pump, wherein the gas contained in the first space is compressed. Furthermore, there is provided a hydraulic motor to be driven by means of the energy accumulator. In this embodiment of the invention it is provided that the ratio of the gas filling pressure in the first space with non-loaded second space to the maximum operating pressure is >0.5. In construction machines known from the prior art, this ratio assumes values of less than 0.5. In this embodiment of the invention, the energy accumulator can for instance also be designed such that the ratio of the volume of the first space with fully loaded second space to the volume of the first space with non-loaded second space is >0.5.

The present invention provides a machine, in particular a construction machine for energy regeneration with flat characteristic and high power density as compared to known machines. The energy density at the pump loading the energy accumulator correspondingly is high in accordance with the invention.

In a further aspect of the invention, the ratio of the volume of the first space with fully loaded second space to the volume of the first space with non-loaded second space is >0.6, >0.7, >0.8 or >0.9.

Particularly advantageously, the ratio of the gas volume of the first space in the fully loaded condition of the second space to the non-loaded condition of the second space lies in the range from about 0.8 to <1, preferably <0.99, <0.98, <0.97, <0.96 and particularly preferably <0.95.

In a further aspect of the invention it is provided that the ratio of the gas filling pressure in the first space with non-loaded second space to the maximum operating pressure is >0.6, >0.7, >0.8 or >0.9.

Particularly preferably, the gas filling pressure raised in accordance with the invention lies in the order of 0.75 to <1, preferably <0.99, <0.98, <0.97, <0.96 and particularly preferably <0.95 of the maximum operating pressure, i.e. the maximum admissible pressure in the first space.

Furthermore, the machine can include a drive unit, for instance in the form of a Diesel engine, and a drive train connected with the drive unit. It is conceivable that the pump can be driven directly or indirectly by the drive unit or the drive train.

In a preferred aspect it is provided that the hydraulic motor is connected with the drive train or some other component of the machine such that the energy output by the hydraulic motor can at least partly be introduced into the drive train or be supplied to the other component. In such an embodiment of the invention, the energy stored in the energy accumulator is converted into mechanical energy by means of the hydraulic motor, which mechanical energy is introduced into the drive train at a suitable point.

The machine of the invention can include one or more than one energy accumulator. The entire storage of energy thus can be performed in a number of, for instance, oil/gas pressure accumulators.

Furthermore, it is conceivable that said first space of the energy accumulator consists of one or more spaces disposed in one or more pressure vessels (for instance in a diaphragm-type or piston-type accumulator) and of one or more spaces disposed in one or more external gas tanks connected with the pressure vessel(s). Thus, it is conceivable for instance to perform the storage of energy in one or more oil/gas pressure accumulators and a number of pure gas accumulators which are connected with the gas space of the oil/gas pressure accumulators. It is conceivable that an external gas tank is associated to each oil/gas pressure accumulator or also that only one or a few oil/gas pressure accumulators are connected with a gas tank. It is furthermore conceivable that a plurality of oil/gas pressure accumulators are connected with one gas tank.

It is furthermore conceivable that there are provided means for detecting the pressure in the energy accumulator, in particular in the first space, and means for shutting off the pump, which are designed such that they shut off the pump when the pressure detected by the means for detecting the pressure exceeds a limit value. In this case, for instance, a shutoff of the loading pump would be effected upon reaching the full filling of the second space of the oil/gas pressure accumulator(s), which might be effected for instance via a defined increase in pressure by means of an end-of-stroke damper at the piston-type accumulator.

In a further aspect of the invention, means can be provided which shut off the hydraulic motor when the amount of fluid contained in the second space falls below a limit value.

It is conceivable for instance that the means include a switch rod at the energy accumulator or a detection means, by means of which the position of an element movable in the energy accumulator can be detected, whose position depends on the filling condition of the second space.

It is conceivable for instance that the energy accumulator is designed as a diaphragm-type or piston-type accumulator or comprises a diaphragm-type or piston-type accumulator.

Said element, whose position can be detected, can for instance be the diaphragm or piston of the diaphragm-type or piston-type accumulator.

In a further aspect of the invention it is provided that the pump and the hydraulic motor are formed by the same structural unit.

In a further aspect of the invention, there are provided means for detecting the pressure as well as means for detecting the temperature in the energy accumulator and means for shutting off the pump, which are connected with said means for detecting the pressure and the temperature. In principle, it is conceivable to perform a regulation via a comparatively simple pressure and temperature detection on the gas side, so that a possibly provided end-of-stroke damper or position sensor etc. might perhaps be omitted. It is of course also conceivable to additionally maintain the end-of-stroke damper and/or position sensor.

The control/regulation thus can be effected via pressure and temperature sensors, which provide measurements acting on the operation of the pump as the only or additional influencing variables.

In accordance with the invention, the regulation or control of the accumulator loading pump thus can be effected via the pressure characteristic in the energy accumulator.

If the energy accumulator is filled by the pump, the case of "reaching the maximum operating pressure" or "maximum filling level" can safely be detected by measuring pressure and temperature of the gas. End-of-stroke damping or a position detection can, but need not be performed in addition.

The above-described case of "shutting off the pump prior to complete evacuation" likewise can safely be detected as a result of the detection of pressure and temperature on the gas side. Switch rods and/or position sensors can be omitted, but can also be provided.

The case of a "partial or complete loss of the gas filling" also can be detected via the measurement of pressure and temperature on the gas side.

In principle, it should be noted that the point of pressure measurement can also be located on the oil side, i.e. the means for detecting the pressure in the energy accumulator might also be connected with the second space, alternatively or in addition to the first space. The point of temperature measurement must be located on the gas side, i.e. the means for detecting the temperature must be connected with the first space. This point of temperature measurement might be completed by an oil-side point of temperature measurement.

The means for detecting the pressure and the means for detecting the temperature can each have their own sensor for pressure measurement and their own sensor for temperature measurement. The use of a combined device including both functionalities is also conceivable.

BRIEF DESCRIPTION OF THE DRAWINGS

Further details and advantages of the invention will be explained in detail with reference to an embodiment illustrated in the drawing, in which.

DESCRIPTION OF THE PREFERRED EMBODIMENTS

Figure 1:
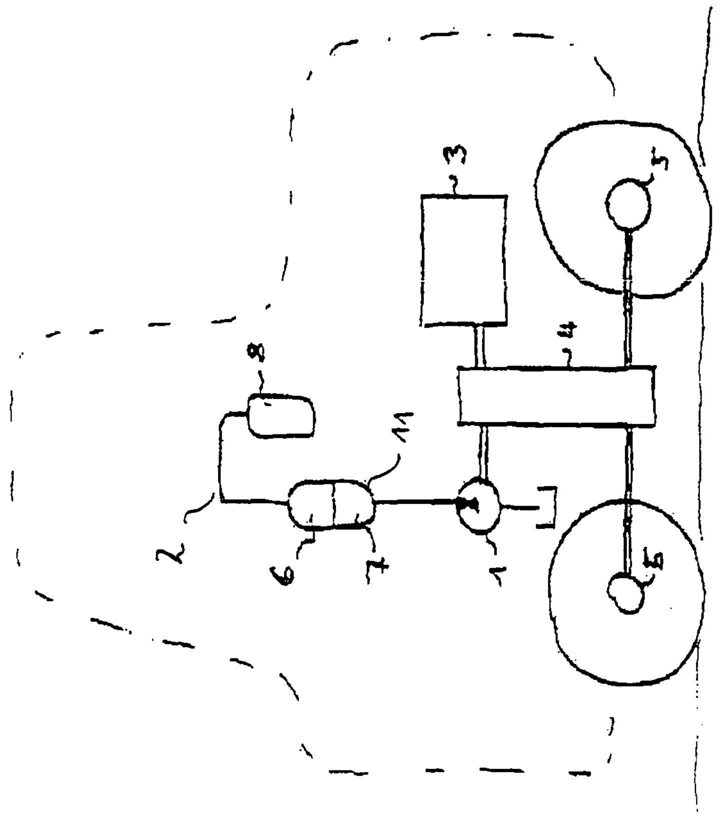
FIG. 1: shows a schematic view of a construction machine in accordance with the invention.

In a schematic representation, FIG. 1 shows a construction machine designed for instance as a wheel loader or dumper. The construction machine includes a Diesel engine designated with the reference numeral 3, which drives the axles/wheels 5 of the machine via the transmission 4. The drive train thus extends from the Diesel engine 3 to the axles/wheels 5.

Directly via the Diesel engine 3 or via the transmission 4, the pump 1 is driven, which in operation delivers oil or any other suitable hydraulic medium from a suitable vessel into the second space 7 of an energy accumulator 2.

The energy accumulator 2 is composed of the oil/gas pressure accumulator 11 and the external gas tank 8.

The space 7 constitutes the oil exchange volume of the oil/gas pressure accumulator 11. The oil/gas pressure accumulator 11 can for instance be a diaphragm-type or piston-type accumulator. The space 7 is variable in its volume and in the oil-loaded condition of the energy accumulator 2 or of the oil/gas pressure accumulator 11 has a correspondingly larger volume than in the unloaded condition, in which no or only a comparatively small amount of oil is contained in the space 7.

The energy accumulator 2 furthermore includes a first space 6, 8 for instance filled with nitrogen, which is composed of the space 6 and the space 8, the space 6 constituting a gas-filled space inside the oil/gas pressure vessel 11 which also includes the oil exchange volume 7. The space 8 is formed by an external pure gas accumulator, which is connected with the first space 6 of the pressure vessel 11, so that the pressures in the spaces 6 and 8 are identical.

In accordance with the invention it is provided that the energy accumulator 2 has a distinctly greater gas volume as compared to conventional types, i.e. a greater volume of the spaces 6, 8 as compared to the oil exchange volume 7. While usual designs have a ratio of the fully loaded to non-loaded gas volumes of less than 0.5, the invention preferably operates in a range from 0.8 to 0.95.

This relatively great gas volume is realized either by the connection of the gas space 6 of the oil/gas pressure accumulator 11 with an external first space 8 located outside the oil/gas pressure accumulator 11, i.e. with an external gas reservoir, or by a correspondingly increased volume of the first space 6 of the oil/gas pressure accumulator 11.

In a preferred aspect of the invention, the energy accumulator operates with a gas filling pressure distinctly raised as compared to the prior art, i.e. at a filling pressure with evacuated second space 7 in the order of 0.75 to 0.95 of the maximum admissible operating pressure, whereas values of less than 0.5 are known from the prior art.

In accordance with the invention, a means for energy regeneration with flat characteristic and high power density as compared to conventional systems is realized by the above measures.

In principle, it is conceivable to perform the entire storage of energy in one or more oil/gas pressure accumulators. It is also conceivable to provide not only one, but a plurality of pumps or hydraulic motors.

The storage of energy can be divided into one or more oil/gas pressure accumulators 11 and one or more pure gas accumulators 8. It is also conceivable to provide no external gas accumulator 8, but perform the storage of energy exclusively in one or more oil/gas pressure accumulators 11.

In accordance with the present invention, the term "energy accumulator" is meant to include the possibility that the entire energy accumulator only consists of oil/gas pressure accumulators without a pure gas accumulator or of a combination of oil/gas pressure accumulators and pure gas accumulators.

Figure 2:
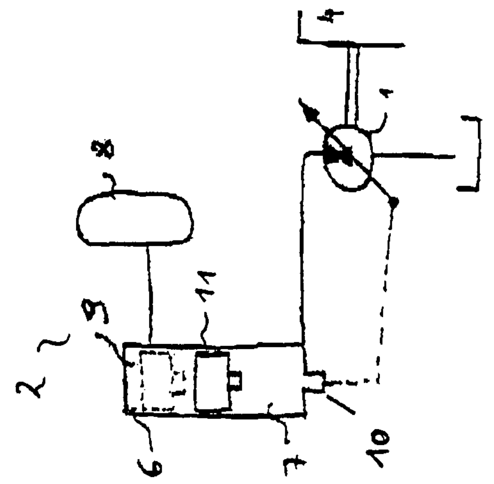
FIG. 2: shows a detailed representation of a piston-type accumulator designed as an oil/gas pressure accumulator including switch rod and external gas accumulator.

In particular in the latter case it can be provided that upon reaching the full oil filling of the second space 7 of the oil/gas pressure accumulator(s) 11, a suitable shutoff of the loading pump 1 is effected, which is conceivable for instance via a defined increase in pressure by means of an end-of-stroke damper 9 as shown in FIG. 2 at the energy accumulator 11 designed as piston-type accumulator.

In both embodiments (with or without external pure gas accumulator), it can furthermore be provided that when operated as motor, i.e. when used as hydraulic motor, the pump is shut off before achieving the complete evacuation of the second space 7, which is possible for instance in that the position of the piston is detected or in that a switch rod 10 is provided on one or more of the oil/gas pressure accumulators, as shown in FIG. 2.

The broken line in FIG. 2 illustrates that it is the function of the switch rod 10 to effect a shutoff of the hydraulic motor 1, which results in that a complete evacuation of the space 7, which might lead to problems during operation of the pump/hydraulic motor 1, is prevented.

As shown in FIG. 1 and FIG. 2, the pump 1 and the hydraulic motor 1 are formed by one and the same structural unit. If the accumulator 2 should be loaded, the unit is operated as pump 1, which results in hydraulic fluid entering the space 7 of the oil/gas pressure vessel 11, whereby a compression of the gas volume contained in the space 6, 8 is effected.

If this energy should be recovered, said unit is operated as hydraulic motor 1, which introduces the mechanical energy into the drive train, for instance into the transmission 4 or also directly onto the wheels or their axles 5.

Figure 3:
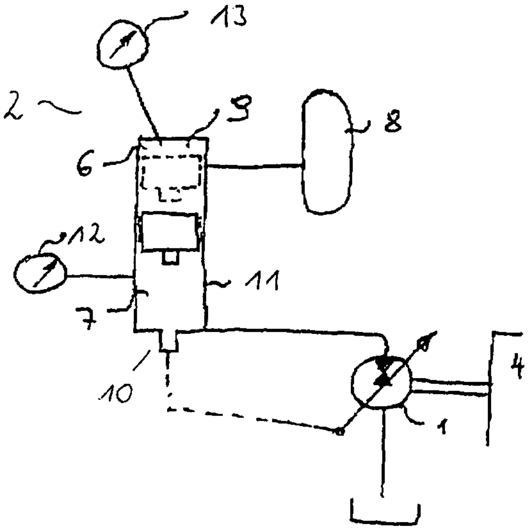
FIG. 3: shows a detailed representation of a piston-type accumulator designed as an oil/gas pressure accumulator as shown in FIG. 2 with an additional point of pressure and temperature measurement.

FIG. 3 shows another embodiment of the present invention. In this representation, the arrangement as shown in FIG. 2 is completed by a temperature sensor 13 and a pressure sensor 12. The temperature sensor 13 is connected with the first space 6, 8 such that the temperature existing in this space 6, 8 is detected. The pressure sensor 12 is connected with the second space 7 such that the pressure existing in the second space 7 is detected. Instead of individual pressure and temperature measuring devices, the devices 12, 13 can also be combined devices, which perform a measurement of pressure and temperature in the respective space.

By measuring pressure and temperature by means of the sensors 12, 13, the condition "maximum operating pressure" or "maximum filling level" can safely be detected. The case of "shutting off prior to complete evacuation" also can safely be detected by means of the measurement of pressure and temperature on the gas or oil side.

As stated above, the point of temperature measurement must be located on the gas side and can be completed by an oil-side point of temperature measurement. The point of pressure measurement can be located on the gas side, on the oil side or on both sides.

Switch rods, position sensors or end-of-stroke dampers can be used with the pressure and temperature sensor alternatively or in addition to the described control/regulation.

The measurement of pressure and/or temperature in one space or in, both spaces can be effected by means of one sensor each or also by means of a plurality of sensors.

On the whole, it is achieved that the present invention provides a construction machine with energy regeneration with flat characteristic and high power density as compared to conventional systems.

The invention claimed is:

1. A construction machine comprising a pump (1), an energy accumulator (2) connected with the pump (1), which includes a first space (6, 8) which is gas-filled, and a second space (7) which is designed such that in operation of the pump (1) the second space is filled by a fluid delivered by the pump (1) to thereby cause the second space to transition from a non-loaded condition to a fully loaded condition wherein the gas contained in the first space (6, 8) is compressed, and a hydraulic motor (1) to be driven by the energy accumulator (2), wherein the energy accumulator (2) is designed such that the ratio of the volume of the first space (6, 8) with fully loaded second space (7) to the volume of the first space (6, 8) with non-loaded second space (7) is >0.5, wherein said construction machine is a wheel loader or dumper.

2. The machine according to claim 1, wherein means are provided which shut off the hydraulic motor (1), when the amount of fluid contained in the second space (7) falls below a limit value.

3. The machine according to claim 2, wherein the means include a switch rod (10) on the energy accumulator (2) or detection means, by which a position of an element movably mounted in the energy accumulator (2) can be detected, wherein said position depends on the filling condition of the second space (7).

4. The machine according to claim 3, wherein the movable element is a diaphragm or a piston of a diaphragm-type or a piston-type accumulator.

5. The machine according to claim 1, wherein means (12, 13) for detecting the pressure and/or temperature in the energy accumulator (2) and shutting off the pump (I) are provided, wherein the means for detecting and the means for shutting off the pump are connected with one another.

6. The machine according to claim 5, wherein the means (12, 13) for detecting the pressure and/or temperature are arranged such that they detect the pressure and/or the temperature in the first space (6, 8) of the energy accumulator (2).

7. The machine according to claim 5, wherein the means (12, 13) for detecting the pressure and/or temperature are arranged such that they detect the pressure and/or the temperature in the second space (7) of the energy accumulator (2).

8. The machine according to claim 5, wherein the means (12, 13) for detecting the pressure and/or temperature are constituted by separate sensors each or are designed as a combined device.

9. The machine according to claim 5, wherein the means for shutting off the pump (1) are designed such that upon reaching a condition "maximum operating pressure" or a "maximum tilling level" or before reaching a condition "complete evacuation of the second space" said means for shutting off the pump shut off the pump (1), and said conditions are determined due to the detection of the pressure and/or temperature by the means (12, 13) for detecting the pressure and/or temperature in the energy accumulator (2).

10. The machine according to claim 1, wherein the machine includes a drive unit (3) and a drive train connected with the drive unit (3).

11. The machine according to claim 10, wherein the pump (1) can be driven directly or indirectly by the drive unit (3) or drive train.

12. The machine according to claim 1, wherein the first space (6, 8) of the energy accumulator (2) is formed of a space (6) disposed in a pressure vessel (11) and/or of an external space (8) which is disposed in an external gas tank connected with the pressure vessel (11).

13. The machine according to claim 1, wherein means for detecting the pressure in the energy accumulator (2) and shutting off the pump (1) are provided, which are designed such that said means shut off the pump (1) when the pressure detected by the means for detecting the pressure exceeds a limit value.

14. The machine according to claim 1, wherein the hydraulic motor (1) is connected with a drive train such that the energy output by the hydraulic motor (1) can at least partly be introduced into the drive train or be supplied to another component.

15. The machine according to claim 1, wherein the ratio of the volume of the first space (6, 8) with fully loaded second space (7) to the volume of the first space (6, 8) with non-loaded second space (7) is >0.6, >0.7, >0.8 or >0.9.

16. The machine according to claim 1, wherein the ratio of the volume of the first space (6, 8) with fully loaded second space (7) to the volume of the first space (6, 8) with non-loaded second space (7) lies in the range from 0.8 to 0.95.

17. The machine according to claim 1, wherein the energy accumulator (2) is designed as a diaphragm-type or piston-type accumulator or comprises a diaphragm-type or piston-type accumulator.

18. The machine according to claim 1, wherein the machine includes one or more than one energy accumulator (2).

19. The machine according to claim 1, wherein the pump (1) and the hydraulic motor (1) are formed by the same structural unit.

20. A construction machine comprising a pump (1), an energy accumulator (2) connected with the pump (1), which includes a first space (6, 8) which is gas-filled, and a second space (7) which is designed such that in operation of the pump (1) the second space is filled by a fluid delivered by the pump (1) to thereby cause the second space to transition from a non-loaded condition to a fully loaded condition wherein the gas contained in the first space (6, 8) is compressed, and a hydraulic motor (1) to be driven by the energy accumulator (2), wherein the ratio of the gas filling pressure in the first space (6, 8) with non-loaded second space (7) to a maximum operating pressure in the first space (6,8) with the second space (7) fully loaded is >0.5, wherein said construction machine is a wheel loader or dumper.

21. The machine according to claim 20, wherein the energy accumulator is designed such that the ratio of the volume of the first space (6, 8) with fully loaded second space (7) to the volume of the first space (6, 8) with non-loaded second space (7) is >0.5.

22. A construction machine comprising a pump (1), an energy accumulator (2) connected with the pump (1), which includes a first space (6, 8) which is gas-filled, and a second space (7) which is designed such that in operation of the pump (1) the second space is filled by a fluid delivered by the pump (1) to thereby cause the second space to transition from a non-loaded condition to a fully loaded condition wherein the gas contained in the first space (6, 8) is compressed, and a hydraulic motor (1) to be driven by the energy accumulator (2), wherein the ratio of the gas filling pressure in the first space (6, 8) with non-loaded second space (7) to a maximum system operating pressure in the first space (6,8) with the second space (7) fully loaded is >0.5, wherein the ratio of the gas filling pressure in the first space (6, 8) with non-loaded second space (7) to the maximum operating pressure is >0.6, >0.7, >0.8 or >0.9, wherein said construction machine is a wheel loader or dumper.

23. A construction machine comprising a pump (1), an energy accumulator (2) connected with the pump (1), which includes a first space (6, 8) which is gas-filled, and a second space (7) which is designed such that in operation of the pump (1) the second space is filled by a fluid delivered by the pump (1) to thereby cause the second space to transition from a non-loaded condition to a fully loaded condition wherein the gas contained in the first space (6, 8) is compressed, and a hydraulic motor (1) to be driven by the energy accumulator (2), wherein the ratio of the gas filling pressure in the first space (6, 8) with non-loaded second space (7) to a maximum system operating pressure in the first space (6,8) with the second space (7) fully loaded is >0.5, wherein the ratio of the gas filling pressure in the first space (6, 8) with non-loaded second space (7) to the maximum operating pressure lies in the range from 0.75 to 0.95 wherein said construction machine is a wheel loader or dumper.

* * * * *